(12) United States Patent
Kuramitsu (10) Patent No.: US 9,540,035 B2
(45) Date of Patent: Jan. 10, 2017

(54) CONTROL APPARATUS

(71) Applicant: DENSO CORPORATION, Kariya, Aichi-pref. (JP)

(72) Inventor: Shuji Kuramitsu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/956,172

(22) Filed: Dec. 1, 2015

(65) Prior Publication Data

US 2016/0159389 A1 Jun. 9, 2016

(30) Foreign Application Priority Data

Dec. 3, 2014 (JP) .................................. 2014-245052

(51) Int. Cl.
*B62D 5/04* (2006.01)

(52) U.S. Cl.
CPC ............. *B62D 5/0484* (2013.01); *B62D 5/049* (2013.01); *B62D 5/0442* (2013.01)

(58) Field of Classification Search
CPC ....... B62D 5/04; B62D 5/0421; B62D 5/0424; B62D 5/0427; B62D 5/046; B62D 5/0463; B62D 5/0481; B62D 5/0484; B62D 5/0487; B62D 5/049
See application file for complete search history.

(56) References Cited

U.S. PATENT DOCUMENTS

| | | | | |
|---|---|---|---|---|
| 6,907,334 B2* | 6/2005 | Yoshida | ............... | B62D 5/0487 180/446 |
| 2003/0052639 A1* | 3/2003 | Tanaka | ................. | B62D 5/0463 318/632 |
| 2013/0292201 A1* | 11/2013 | Yamanaka | ........... | B62D 5/0427 180/402 |
| 2014/0149000 A1* | 5/2014 | Tamura | ................ | B62D 5/0481 701/42 |
| 2015/0203148 A1* | 7/2015 | Kuramitsu | ........... | B62D 5/0463 701/41 |

FOREIGN PATENT DOCUMENTS

JP 2013-126822 A 6/2013

* cited by examiner

*Primary Examiner* — Anne Marie Boehler
(74) *Attorney, Agent, or Firm* — Knobbe, Martens, Olson & Bear, LLP (57) ABSTRACT

A control apparatus controls a motor of an electric power steering system including: an input shaft connected to a steering member; a column shaft connected to the input shaft; a turning device that includes a rack and pinion mechanism, and turns a wheel; and the motor. The control apparatus includes a reliability computation portion that computes a reliability according to an abnormality detection state regarding at least one of a current sensor, a torque sensor, and a rotational angle sensor; a steering-shaft load estimation portion that estimates a steering shaft load using a current corresponding value, a torque corresponding value, and a rotational angle corresponding value; and a weight changing portion that changes a weighting of the current corresponding value, the torque corresponding value, or the rotational angle corresponding value according to the reliability.

11 Claims, 7 Drawing Sheets

CONTROL APPARATUS

CROSS REFERENCE TO RELATED APPLICATION

This application is based on Japanese Patent Application No. 2014-245052 filed on Dec. 3, 2014, the disclosure of which is incorporated herein by reference.

TECHNICAL FIELD

The present disclosure relates to a control apparatus controlling an electric power steering device.

BACKGROUND

Patent literature 1: JP 2013-126822 A

Conventionally, an electric power steering device that uses a motor as a drive source is disclosed. For example, patent literature 1 discloses an electric power steering device (also, referred to as a motor-driven power steering device). In the electric power steering device, an axial force applied to a steering shaft is estimated based on values from a torque sensor, a current sensor, and motor rotational angular speed detecting means, and the estimated axial force is used in a program for improving steering feeling.

The inventor of the present disclosure has found the following.

When sensor abnormality which includes the abnormality of the torque sensor, the current sensor, or a rotational angle sensor is detected, a predetermined time for confirming the abnormality as a malfunction after an initial detection of the abnormality is required to avoid an erroneous determination. In the electric power steering device in patent literature 1, a sensor abnormality is not taken into consideration. Thus, an axial force is estimated using a low-reliability sensor value during a period of time from the detection of abnormality until the confirmation of malfunction.

SUMMARY

It is an object of the present disclosure to provide a control apparatus that is capable of appropriately estimating a steering shaft load according to the detection state of abnormality of a sensor.

According to one aspect of the present disclosure, a control apparatus controlling a motor of an electric power steering system including: an input shaft that is connected to a steering member turned by a driver; a column shaft that is connected to the input shaft at a position opposite to the steering member; a turning device that includes a rack and pinion mechanism converting the rotational motion of the column shaft into a reciprocating motion, and turns a wheel; and the motor that generates assist torque assisting turning of the steering member is provided. The control apparatus includes a reliability computation portion that computes a reliability according to an abnormality detection state for at least one of (i) a current sensor detecting an energization current to the motor, (ii) a torque sensor detecting a steering torque, and (iii) a rotational angle sensor detecting a rotational angle of the motor, a steering-shaft load estimation portion that estimates a steering shaft load using (i) a current corresponding value corresponding to a detection value from the current sensor, (ii) a torque corresponding value corresponding to a detection value from the torque sensor, and (iii) a rotational angle corresponding value corresponding to a detection value from the rotational angle sensor, and a weight changing portion that changes a weighting of the current corresponding value, the torque corresponding value, or the rotational angle corresponding value that corresponds to a sensor, an abnormality of which is detected, according to the reliability, the weighting is used for estimation of the steering shaft load.

During a period of the time from when the abnormality of a sensor is detected until the sensor is confirmed as malfunctioning or as returning to a normal state, the sensor may detect an inappropriate value. For example, when a detection value rapidly changes due to the abnormality of a sensor, the steering shaft load computed using the detection value may also rapidly change. On the contrary, in the present disclosure, the reliability value of a sensor is computed according to an abnormality detection state, and weighting of a value used for computing the steering shaft load is changed according to the reliability value. Therefore, it may be possible to appropriately estimate the steering shaft load according to the abnormality detection state. It may be possible to appropriately compute the assist torque command value when the assist torque command value is computed based on the steering shaft load. Accordingly, a rapid change in sensor value caused by sensor abnormality may be unlikely to affect the computed assist torque command value, and thus, it may be possible to reduce an influence of the sensor abnormality on vehicle behavior.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

A control apparatus of the present disclosure will be described with reference to the drawings. In multiple embodiments to be described, the identical reference sings will be assigned to substantially the same configuration elements, and the description will be omitted.

First Embodiment

A control apparatus in a first embodiment of the present disclosure will be described with reference to FIG. 1 to FIG. 3.

Figure 1:
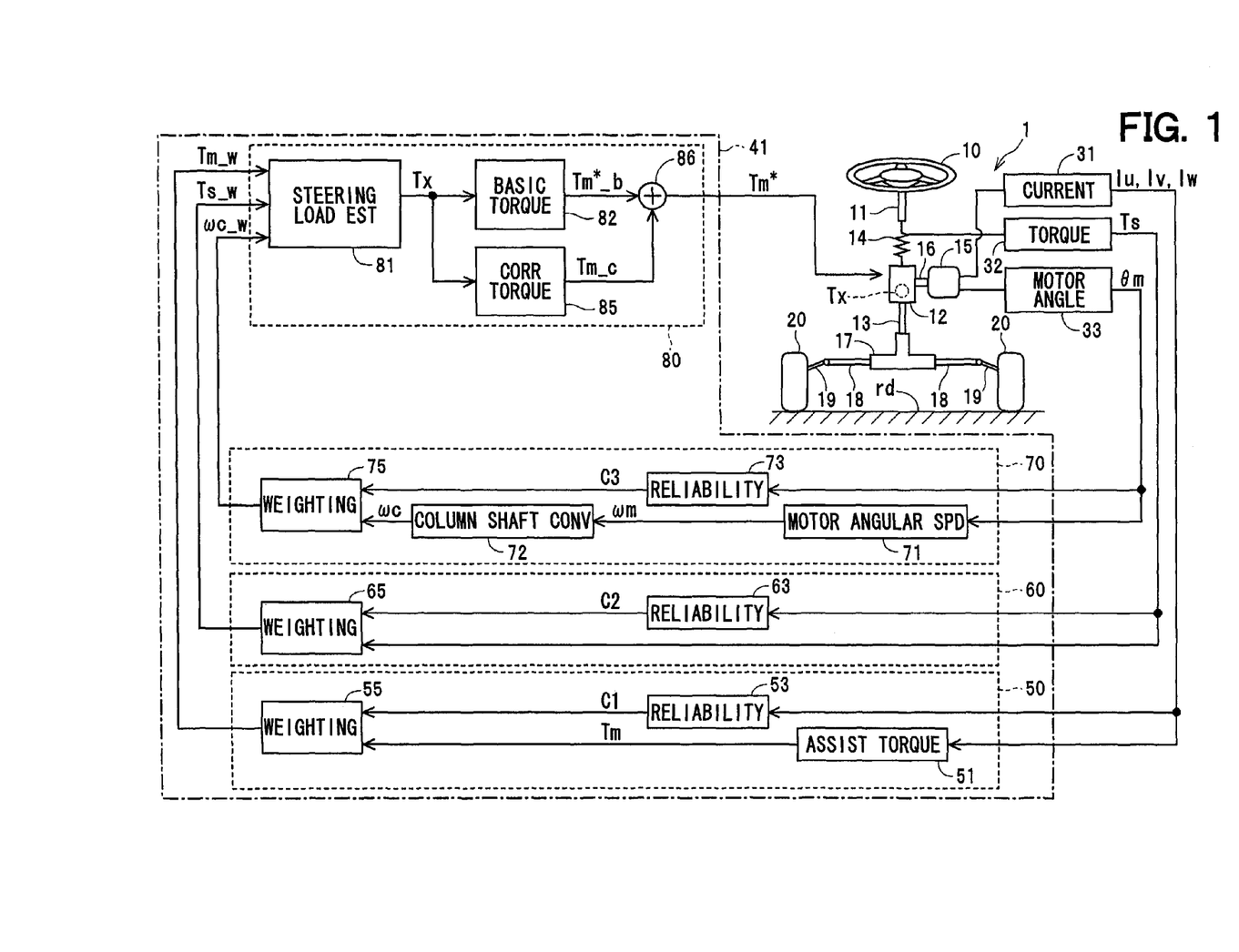
FIG. 1 is a diagram illustrating a schematic configuration of a control apparatus in a first embodiment.
Figure 2:
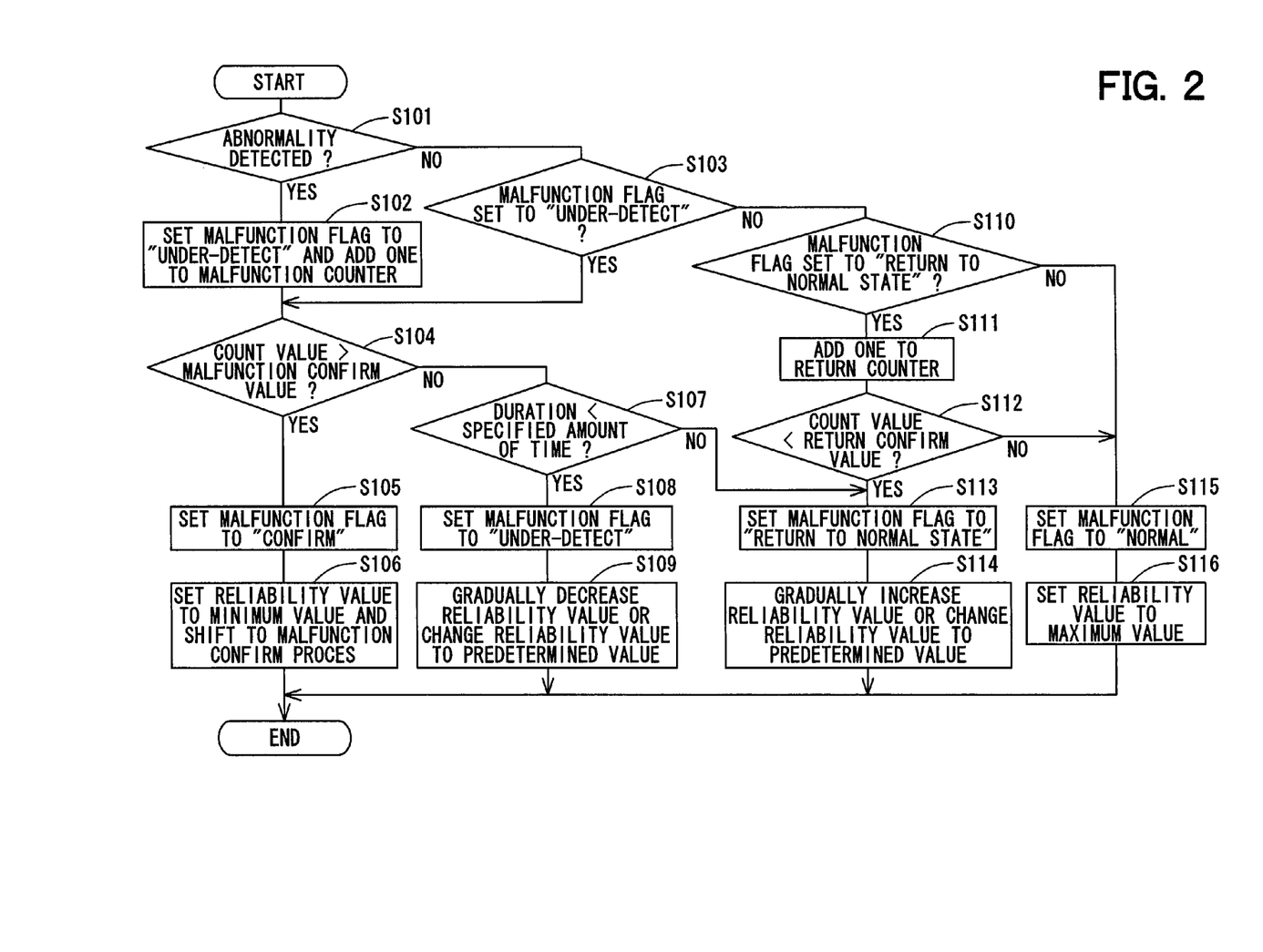
FIG. 2 is a flowchart illustrating a reliability computation process in the first embodiment.

As illustrated in FIG. 1, a control apparatus 41 in the present embodiment controls a driving of a motor 15 used in an electric power steering system 1. Incidentally, the electric power steering system may be referred to as a motor-driven power steering system.

The electric power steering system 1 includes a steering wheel 10 that corresponds to a steering member, an input shaft 11, a column shaft 12, an intermediate shaft 13, a torsion bar 14, the motor 15, a worm gear 16, a turning device 17, a current sensor 31, a torque sensor 32, a motor rotational angle sensor (hereinafter, referred to as a rotational angle sensor) 33, and the like.

A driver operates the steering wheel 10. The steering wheel 10 is connected to one end of the input shaft 11. The input shaft 11 is connected to the column shaft 12 via the torsion bar 14.

The column shaft 12 is connected to the other end of the input shaft 11 via the torsion bar 14, with the other end positioned opposite to the steering wheel 10. The column shaft 12 is connected to the motor 15 via the worm gear 16. The motor 15 is a three-phase alternating current motor. Torque output from the motor 15 has an assist torque detection value Tm, is transmitted to the column shaft 12 via the worm gear 16, and assists the rotation of the column shaft 12. The electric power steering system 1 in the present embodiment is a column assist electric power steering system that assists the rotation of the column shaft 12 by adding torque (having the assist torque detection value Tm) of the motor 15.

The intermediate shaft 13 connects the column shaft 12 to the turning device 17. Thus, the intermediate shaft 13 transmits the rotation of the column shaft 12 to the turning device 17.

The turning device 17 includes a rack and pinion mechanism with a rack and a pinion (not illustrated). The turning device 17 converts the rotational motion of the column shaft 12 to the reciprocating motion of the rack with the rotational motion transmitted via the intermediate shaft 13. Tie rods 18 are respectively provided on both ends of the rack. The tie rods 18 reciprocate along with the rack in a rightward and leftward direction, and pull or push knuckle arms 19 that are respectively provided between the tie rods 18 and wheels 20. Therefore, the wheels 20 in contact with a road surface rd turn.

The current sensor 31 detects phase currents Iu, Iv, Iw that are energized to the phases of the motor 15.

The torque sensor 32 detects torsion torque based on a twist angle of the torsion bar 14. In the present embodiment, the torsion torque detected by the torque sensor 32 will be referred to as a steering torque.

The rotational angle sensor 33 detects a mechanical angle $\theta m$ of the motor 15. The mechanical angle $\theta m$ will be referred to as a motor rotational angle $\theta m$.

The control apparatus 41 receives a detection signal indicating the phase currents Iu, Iv, Iw detected by the current sensor 31, a detection signal indicating the steering torque detected by the torque sensor 32, and a detection signal indicating the motor rotational angle $\theta m$ detected by the rotational angle sensor 33.

The control apparatus 41 includes a microcomputer, and includes a CPU, a ROM, a RAM, an I/O, a bus line connecting together these configuration elements. Each process performed by the control apparatus 41 may be a hardware process performed by a dedicated electronic circuit, or may be a software process in which the CPU executes a pre-stored program, or may be a combination of the hardware process and the software process.

The control apparatus 41 includes a first input value computation portion 50, a second input value computation portion 60, a third input value computation portion 70, and a command value computation portion 80.

The first input value computation portion 50 includes an assist torque computation portion 51, a first reliability computation portion 53, and a first weighting computation portion 55.

The assist torque computation portion 51 calculates the assist torque detection value Tm based on the phase currents Iu, Iv, Iw acquired by the current sensor 31. The assist torque detection value Tm is calculated by dq-transforming the phase currents Iu, Iv, Iw, and multiplying a q-axis current Iq by a torque conversion coefficient.

The first reliability computation portion 53 computes a first reliability value C1 that is a reliability degree of the assist torque detection value Tm based on the phase currents Iu, Iv, Iw acquired by the current sensor 31. When the current sensor 31 is in a normal state, the first reliability value C1 is set to a maximum value (for example, one). When the current sensor 31 is confirmed as malfunctioning, the first reliability value is set to a minimum value (for example, zero). The first reliability value C1 is set to a value between the minimum value and the maximum value during a period of time after the detection of abnormality before the current sensor 31 is confirmed as malfunctioning or as returning to a normal state.

In the present embodiment, when a count value NE1 of a malfunction counter after the abnormality of the current sensor 31 is detected is equal to a malfunction confirmation value NE1_f, the current sensor 31 is confirmed as malfunctioning. The first reliability value C1 decreases as the count value NE1 comes close to the malfunction confirmation value NE1_f. When the current sensor 31 returns to the normal state without being confirmed as malfunctioning within a predetermined amount of time after the abnormality of the current sensor 31 is detected, the first reliability value C1 increases as a count value NR1 of a return counter comes close to a return confirmation value NR1_f.

A reliability computation process performed by the first reliability computation portion 53 will be described with reference to the flowchart illustrated in FIG. 2.

In S101, it is determined whether the abnormality of the current sensor 31 is detected. It is determined that the abnormality of the current sensor 31 is not detected (S101: NO), the process proceeds to S103. It is determined that the abnormality of the current sensor 31 is detected (S101: YES), the process proceeds to S102.

It is noted that a flowchart or a process of the flowchart in the present application includes steps (also referred to as sections), each of which is represented, for example, as S101. Each step may be divided into several sub-steps, and several steps may be combined into a single step.

In S102, a malfunction flag is set to "under-detection". The malfunction counter increments. The process proceeds to S104. When the count value NR1 of the return counter is not zero, the return counter is reset.

In S103, it is determined whether the malfunction flag is set to the under-detection. When it is determined that the malfunction flag is not set to the under-detection (S103: NO), the process proceeds to S110. When it is determined that the malfunction flag is set to the under-detection (S103: YES), the process proceeds to S104.

In S104, it is determined whether the count value NE1 of the malfunction counter is greater than the malfunction confirmation value NE1_f. When it is determined that the count value NE1 of the malfunction counter is less than or equal to the malfunction confirmation value NE1_f (S104: NO), the process proceeds to S107. When it is determined whether the count value NE1 of the malfunction counter is greater than the malfunction confirmation value NE1_f (S104: YES), the process proceeds to S105.

In S105, the malfunction flag is set to a "confirmation".

In S106, the reliability value C1 is set to the minimum value, and the process proceeds to a process when the malfunction is confirmed.

In S107 to which the process has proceeded when it is determined that the count value NE1 of the malfunction counter is less than or equal to the malfunction confirmation value NE1_f (S104: NO), it is determined whether a duration (also referred to as a duration time) after the abnormality is detected is less than the predetermined amount of time. When it is determined that the duration is greater than or equal to the predetermined amount of time (S107: NO), the process proceeds to S113. When it is determined that the duration is less than the predetermined amount of time (S107: YES), the process proceeds to S108.

In S108, the malfunction flag remains the under-detection.

In S109, the reliability value C1 decreases gradually. Or according to the count value NE1 of the malfunction counter, the reliability value C1 is changed to a predetermined value less than or equal to the last reliability value. When it is determined to be "YES" (that is, when an affirmative determination is performed) in S103, in S109, the last reliability value may maintain.

In S110 to which the process has proceeded when it is determined that sensor abnormality is not detected and the malfunction flag is not set to the under-detection (S101: NO and S103: NO), it is determined whether the malfunction flag is set to "return to the normal state". When it is determined that the malfunction flag is not set to the return to the normal state (S110: NO), the process proceeds to S115. When it is determined that the malfunction flag is set to the return to the normal state (S110: YES), the process proceeds to S111.

In S111, the count value NR1 of the return counter increments.

In S112, it is determined whether the count value NR1 of the return counter is less than the return confirmation value NR1_f. When it is determined that the count value NR1 of the return counter is greater than or equal to the return confirmation value NR1_f (S112: NO), the process proceeds to S115. When it is determined that the count value NR1 of the return counter is less than the return confirmation value NR1_f (S112: YES), the process proceeds to S113.

In S113, the malfunction flag is set to the return to the normal state.

In S114, the reliability value C1 decreases gradually, or according to the count value NR1 of the return counter, the reliability value C1 is changed to a predetermined value greater than or equal to the last reliability value.

In S115 to which the process has proceeded when it is determined that the malfunction flag is not set to the under-detection and the return to the normal state (S109: NO and S110: NO), or it is determined that the count value NR1 of the return counter is greater than or equal to the return confirmation value NR1_f (S112: NO), the malfunction flag is set to "normal". The abnormality counter is reset and the return counter is also reset.

In S116, the reliability value is set to the maximum value.

The first weighting computation portion 55 receives the assist torque detection value Tm from the assist torque computation portion 51 and the first reliability value C1 from the first reliability computation portion 53. The first weighting computation portion 55 computes an assist torque weighting value Tm_w as the first input value based on the assist torque detection value Tm and the first reliability value. C1. The assist torque weighting value Tm_w is computed using the following expression (1).

$$Tm\_w = Tm \times Wm \quad (1)$$

Wm in the expression (1) represents a weighting coefficient for the assist torque detection value Tm. When the current sensor 31 is in a normal state, the weighting coefficient Wm is set to one. When the current sensor 31 is confirmed as malfunction, the weighting coefficient Wm is set to zero. The weighting coefficient Wm is set to a value between zero and one according to the first reliability value C1 during a period of time after the abnormality of the current sensor 31 is detected before the current sensor 31 is confirmed as malfunctioning or returning to a normal state. In the present embodiment, during a period of time from the detection of abnormality until the abnormality is confirmed as a malfunction, the weighting coefficient Wm gradually decreases according to the first reliability value C1. During a period of time in which the predetermined amount of time has elapsed without the malfunction of the current sensor 31 being confirmed and the current sensor 31 returns to the normal state, the weighting coefficient Wm gradually increases within a range of less than or equal to one according to the first reliability value C1.

Incidentally, the weighting coefficient Wm may be the first reliability value C1 itself, or may be a converted value of the first reliability value C1.

The second input value computation portion 60 includes a second reliability computation portion 63 and a second weighting computation portion 65.

The second reliability computation portion 63 computes a second reliability value C2 that is the reliability of a steering torque detection value Ts based on the steering torque detection value Ts acquired by the torque sensor 32. In the present embodiment, the second reliability value C2 is set to a maximum value (for example, one) when the torque sensor 32 is in a normal state. The second reliability value C2 is set to a minimum value (for example, zero) when the torque sensor 32 is confirmed as malfunctioning. The second reliability value C2 is set to a value between the minimum value and the maximum value during a period of time after the detection of abnormality and before the torque sensor 32 is confirmed as malfunctioning or returning to a normal state.

In the present embodiment, when a count value NE2 of a malfunction counter after the abnormality of the torque sensor 32 is detected is equal to a malfunction confirmation value NE2_f, the torque sensor 32 is confirmed as malfunctioning. The second reliability value C2 decreases as the count value NE2 comes close to the malfunction confirmation value NE2_f. When the torque sensor 32 returns to the normal state without being confirmed as malfunctioning after the abnormality of the torque sensor 32 is detected, the second reliability value C2 increases as a count value NR2 of a return counter comes close to a return confirmation value NR2_f.

A reliability computation process performed by the second reliability computation portion 63 is the same as the process performed by the first reliability computation portion 53, and the description of the reliability computation process of the second reliability computation portion 63 will be omitted.

The second weighting computation portion 65 receives the steering torque detection value Ts from the torque sensor 32 and the second reliability value C2 from the second reliability computation portion 63. The second weighting computation portion 65 computes a steering torque weighting value Ts_w as the second input value based on the steering torque detection value Ts acquired by the torque sensor 32 and the second reliability value C2. The steering torque weighting value Ts_w is computed using an expression (2).

$$Ts\_w = Ts \times Ws \qquad (2)$$

Ws in the expression (2) represents a weighting coefficient for the steering torque detection value Ts. When the torque sensor 32 is in a normal state, the weighting coefficient Ws is set to one. When the torque sensor 32 is confirmed as malfunction, the weighting coefficient Ws is set to zero. The weighting coefficient Ws is set to a value between zero and one according to the second reliability value C2 during a period of time from when the abnormality of the torque sensor 32 is detected until the torque sensor 32 is confirmed as malfunctioning or returning to a normal state. In the present embodiment, during a period of time after the detection of abnormality and before the abnormality is confirmed as a malfunction, the weighting coefficient Ws gradually decreases according to the second reliability value C2. During a period of time in which a predetermined amount of time has elapsed without the malfunction of the torque sensor 32 being confirmed and the torque sensor 32 returns to the normal state, the weighting coefficient Ws gradually increases within a range of less than or equal to one according to the second reliability value C2.

The weighting coefficient Ws may be the second reliability value C2, or may be a converted value of the second reliability value C2.

The third input value computation portion 70 includes a motor angular speed computation portion 71, a column shaft conversion portion 72, a third reliability computation portion 73, and a third weighting computation portion 75.

The motor angular speed computation portion 71 computes a motor angular speed detection value $\omega m$ based on the motor rotational angle $\theta m$ acquired by the rotational angle sensor 33.

The column shaft conversion portion 72 computes a column-shaft angular speed detection value $\omega c$ (that is, the rotational angular speed of the column shaft 12) by converting the motor angular speed detection value $\omega m$ based on the gear ratio of the worm gear 16. In the present embodiment, the column-shaft angular speed detection value $\omega c$ represents a "detection value of the rotational angular speed of the column shaft".

The third reliability computation portion 73 computes a third reliability value C3 which is the reliability of the rotational angle sensor 33 based on the motor rotational angle $\theta m$ acquired by the rotational angle sensor 33. In the present embodiment, when the rotational angle sensor 33 is in the normal state, the third reliability value C3 is set to a maximum value (for example, one). When the rotational angle sensor 33 is confirmed as malfunction, the third reliability value C3 is set to a minimum value (for example, zero). The third reliability value C3 is set to a value between the minimum value and the maximum value during a period of time from the detection of abnormality until the rotational angle sensor 33 is confirmed as malfunctioning or returning to the normal state.

In the present embodiment, when a count value NE3 of a malfunction counter after the abnormality of the rotational angle sensor 33 is detected is equal to a malfunction confirmation value NE3_f, the rotational angle sensor 33 is confirmed as malfunctioning. The third reliability value C3 decreases as the count value NE3 comes close to the malfunction confirmation value NE3_f. When the rotational angle sensor 33 returns to the normal state without being confirmed as malfunctioning after the abnormality of the rotational angle sensor 33 is detected, the third reliability value C3 increases as a count value NR3 of a return counter comes close to a return confirmation value NR3_f.

A reliability computation process performed by the third reliability computation portion 73 is the same as the process performed by the first reliability computation portion 53, and the description thereof will be omitted.

The third weighting computation portion 75 receives the column shaft angular speed detection value $\omega c$ from the column shaft conversion portion 72 and the third reliability value C3 from the third reliability computation portion 73.

The third weighting computation portion 75 computes a column-shaft angular speed weighting value $\omega c\_w$ as the third input value based on the column shaft angular speed detection value $\omega c$ and the third reliability value C3. The column-shaft angular speed weighting value $\omega c\_w$ is computed using an expression (3).

$$\omega c\_w = \omega c \times W\omega \qquad (3)$$

$W\omega$ in the expression (3) represents a weighting coefficient for the column-shaft angular speed detection value $\omega c$. When the rotational angle sensor 33 is in a normal state, the weighting coefficient $W\omega$ is set to one. When the rotational angle sensor 33 is confirmed as malfunctioning, the weighting coefficient $W\omega$ is set to zero. The weighting coefficient $W\omega$ is set to a value between zero and one according to the third reliability value C3 during a period of time from when the abnormality of the rotational angle sensor 33 is detected until the rotational angle sensor 33 is confirmed as malfunctioning or returning to a normal state. In the present embodiment, during a period of time from the detection of abnormality until the abnormality is confirmed as a malfunction, the weighting coefficient $W\omega$ is gradually decreased according to the third reliability value C3. During a period of time in which a predetermined amount of time has elapsed without the malfunction of the rotational angle sensor 33 being confirmed, and the rotational angle sensor 33 returns to the normal state, the weighting coefficient $W\omega$ gradually increases within a range of less than or equal to one according to the third reliability value C3.

The weighting coefficient $W\omega$ may be the third reliability value C3, or may be a converted value of the third reliability value C3.

The command value computation portion 80 includes a steering-shaft load estimation portion 81, a basic torque computation portion 82, a correction torque computation portion 85, an adder 86.

The steering-shaft load estimation portion 81 estimates a steering shaft load Tx. The steering shaft load Tx is a load that is applied to the steering shaft in a steering operation when a driver operates the steering wheel and assist torque is applied by the driving of the motor 15. The steering shaft load Tx is torque applied to an X portion which is the vicinity of a connection portion between the column shaft 12 and the intermediate shaft 13. The estimation of the steering shaft load Tx will be described later.

The basic torque computation portion 82 computes a basic assist torque command value Tm*_b based on the steering shaft load Tx estimated by the steering-shaft load estimation portion 81.

The correction torque computation portion 85 computes correction torque Tm_c for correcting the basic assist torque command value Tm*_b while the turning of the steering wheel 10, the restoring of the steering wheel 10 back to an original position, or the straight-ahead restoration of a vehicle are taken into consideration. In the present embodiment, the correction torque Tm_c is computed using the steering shaft load Tx. The correction torque Tm_c may be computed without using the steering shaft load Tx.

The adder 86 computes an assist torque command value Tm* by adding the basic assist torque command value Tm*_b and the correction torque Tm_c together. The motor 15 is controlled based on the assist torque command value Tm*.

The computation of the steering shaft load Tx performed by the steering-shaft load estimation portion 81 will be described with reference to FIG. 3.

Figure 3:
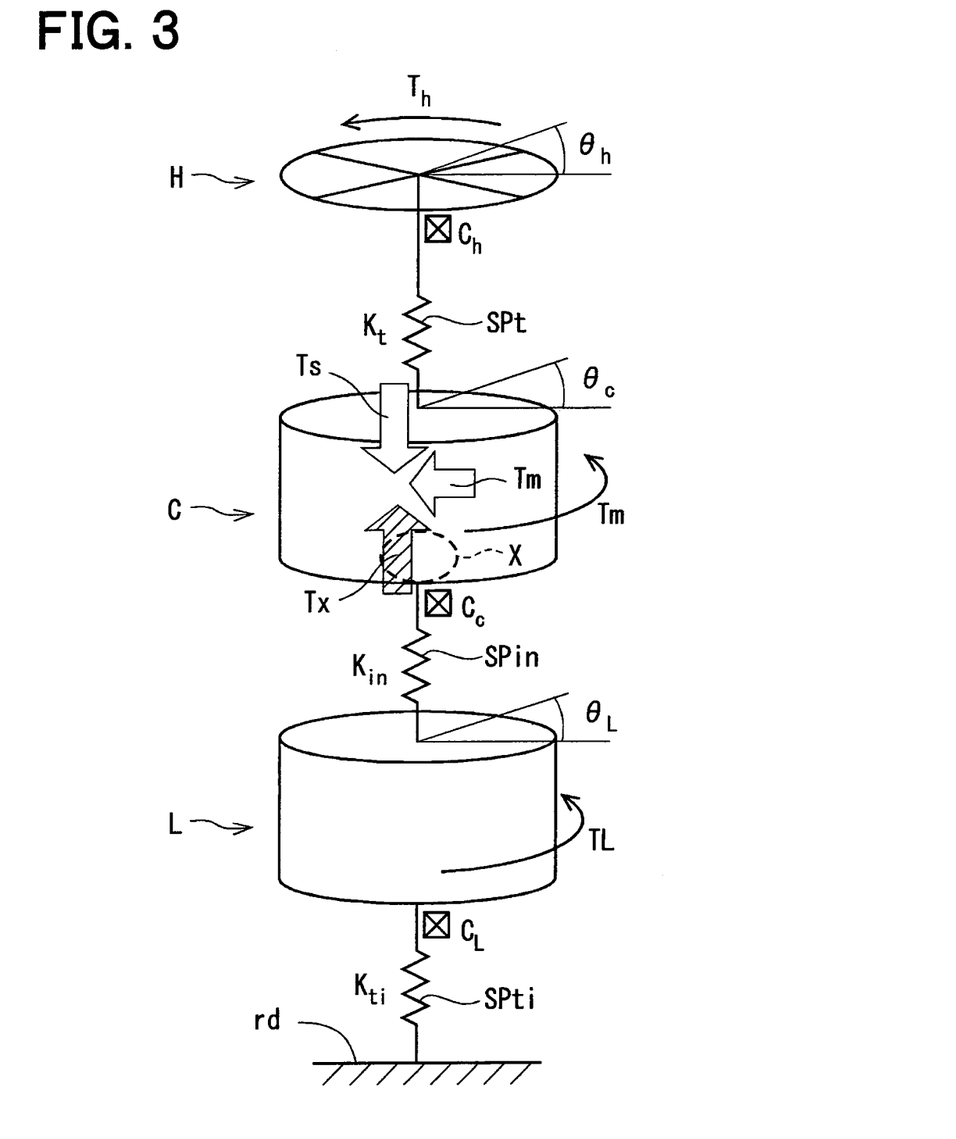
FIG. 3 is a diagram illustrating a model of an electric power steering system in the first embodiment.

FIG. 3 is a modeling diagram of the electric power steering system 1. It is supposed that the electric power steering system 1 includes three inertia masses such as a "steering wheel section H", a "column section C", and a "load section L", and springs connecting together these three inertia masses. The steering wheel section H is connected to the column section C via a spring SPt. The column section C is connected to the load section L via a spring Spin. The load section L is connected to the road surface rd via a spring SPti.

With regard to a correlation between configurations of the modeling diagram and the electric power steering system 1, the steering wheel 10 and the input shaft 11 correspond to the "steering wheel section H", the column shaft 12 connected to the motor 15 via the worm gear 16 corresponds to the "column section C", the configuration from the turning device 17 to the wheels 20 corresponds to the "load section L", the torsion bar 14 corresponds to the "spring SPt", the intermediate shaft 13 corresponds to the "spring SPin", and the tires of the wheels 20 correspond to the "spring SPti". $k_t$ represents a torsional spring constant of the "spring SPt", $k_{in}$ represents a torsional spring constant of the "spring Spin", and $K_{ti}$ represents a torsional spring constant of the "spring SPti".

With regard to signs denoted in FIG. 3, T represents torque, C represents a viscosity frictional coefficient, θ represents a rotational angle, and subscripts "h", "c", "L" represent quantities in the steering wheel section H, the column section C, and the load section L, respectively. A sign J in an expression to be described later represents the moment of inertia. A value in these expressions obtained by differentiating a column shaft rotational angle θc once is equal to the column-shaft angular speed detection value ωc. Tm in the computational expressions using this model is a converted value obtained by converting the assist torque detection value Tm of the motor 15 using the gear ratio of the worm gear 16.

Equations of motion of each section in the model illustrated in FIG. 3 are represented by an expression (4), an expression (5), and an expression (6).

$$J_h \ddot{\theta}_h = -k_t(\theta_h \theta_c) - C_h \dot{\theta}_h + Th \quad (4)$$

$$J_c \ddot{\theta}_c = k_t(\theta_h - \theta_c) - C_c \dot{\theta}_c - k_{in}(\theta_c - \theta_L) + Tm \quad (5)$$

$$J_L \ddot{\theta}_L = k_{in}(\theta_c \theta_L) - C_L \dot{\theta}_L - k_{ti} \theta_L + TL \quad (6)$$

An expression (7) is obtained by modifying the expression (5) for the column section C.

$$k_{in}(\theta_c - \theta_L) = Tm + k_t(\theta_h - \theta_c) - C_c \dot{\theta}_c - J_c \ddot{\theta}_c \quad (7)$$

The steering shaft load Tx is torque applied to the X portion. It may be considered that the torque applied to the X portion is equal to torque applied to the intermediate shaft 13. The steering shaft load Tx is represented by an expression (8).

$$Tx = k_{in}(\theta_c - \theta_L) \quad (8)$$

$$= Tm + k_t(\theta_h - \theta_c) - C_c \dot{\theta}_c - J_c \ddot{\theta}_c$$

$$= Tm + Ts - C_c \dot{\theta}_c - J_c \ddot{\theta}_c$$

According to the expression (8), the steering shaft load Tx can be estimated based on information regarding the assist torque detection value Tm, the steering torque detection value Ts, and the column-shaft angular speed detection value ωc. In the present embodiment, the weighting coefficients Wm, Ws, Wω are respectively changed according to the reliability value C1 of the current sensor 31, the reliability value C2 of the torque sensor 32, and the reliability value C3 of the rotational angle sensor 33. The estimation expression of the steering shaft load Tx containing the weighting coefficients Wm, Ws, Wω is represented by an expression (9). A sign s in the expression (9) is a Laplace operator.

$$Tx = Tm \cdot Wm + Ts \cdot Ws - C_c \dot{\theta}_c \cdot W\omega - J_c \cdot s \cdot \dot{\theta}_c \cdot W\omega \quad (9)$$

In the present embodiment, a time lag occurs until the current sensor 31 is confirmed as malfunctioning or returning to a normal state after the abnormality of the current sensor 31 is detected. During a period of time from the detection of abnormality until the abnormality is confirmed as a malfunction, the steering shaft load Tx is estimated using the assist torque detection value Tm that is computed based on the phase currents Iu, Iv, Iw detected by the current sensor 31. The assist torque command value Tm* for controlling the driving of the motor 15 is computed using the computed steering shaft load Tx.

In the present embodiment, the weighting coefficient Wm for the assist torque detection value Tm is changed according to the reliability of the current sensor 31 during a period of time from when the abnormality of the current sensor 31 is detected until the current sensor 31 is confirmed as malfunctioning or returning to a normal state. That is, the weighting coefficient Wm for the assist torque detection value Tm is changed according to the reliability of the current sensor 31 after the abnormality of the current sensor 31 is detected and before the current sensor 31 is confirmed as malfunctioning or returning to a normal state.

Similarly, during a period of time from when the abnormality of the torque sensor 32 is detected until the torque sensor 32 is confirmed as malfunctioning or returning to a normal state, the steering shaft load Tx is estimated using the steering torque detection value Ts obtained by the torque sensor 32, and the estimated steering shaft load Tx is used for computing the assist torque command value Tm*.

In the present embodiment, the weighting coefficient Ws for the steering torque detection value Ts is changed according to the reliability of the torque sensor 32 during a period of time from when the abnormality of the torque sensor 32 is detected until the torque sensor 32 is confirmed as malfunctioning or returning to a normal state.

During a period of time from when the abnormality of the rotational angle sensor 33 is detected until the rotational angle sensor 33 is confirmed as malfunctioning or returning to a normal state, the steering shaft load Tx is estimated using the column-shaft angular speed detection value ωc that is computed based on the motor rotational angle θm detected by the rotational angle sensor 33. The estimated steering shaft load Tx is used for computing the assist torque command value Tm*.

In the present embodiment, the weighting coefficient Wω for the column-shaft angular speed detection value ωc is changed according to the reliability of the rotational angle sensor 33 during a period of time from when the abnormality of the rotational angle sensor 33 is detected until the rotational angle sensor 33 is confirmed as malfunctioning or returning to a normal state.

Accordingly, it may be possible to estimate the steering shaft load Tx according the respective reliability values C1, C2, C3 of the sensors 31 to 33. Since the weighting coefficients Wm, Ws, Wω can be changed according to the reliability values C1, C2, C3, respectively, it may be possible that a rapid change in sensor value caused by sensor abnormality is unlikely to affect the estimated steering shaft load Tx. Therefore, it may be possible to reduce the impact of the sensor abnormality on vehicle behavior.

The control apparatus 41 controls the motor of the electric power steering system 1. The electric power steering system 1 includes the input shaft 11, the column shaft 12, the turning device 17, and the motor 15. The input shaft 11 is connected to the steering wheel 10 that is turned by a driver. The column shaft 12 is connected to the other side of the input shaft 11 with the other side positioned opposite to the steering member. The turning device 17 includes the rack and pinion mechanism that converts the rotational motion of the column shaft 12 into a reciprocating motion, and turns the wheels 20. The motor 15 produces assist torque that assists the turning of the steering wheel 10.

The control apparatus 41 includes the reliability computation portions 53, 63, 73, the steering-shaft load estimation portion 81, and the weighting computation portions 55, 65, 75.

The reliability computation portions 53, 63, 73 compute at least one of the reliability value C1 of the current sensor 31 for detecting energization current to the motor 15, the reliability value C2 of the torque sensor 32 for detecting steering torque, and the reliability value C3 of the rotational angle sensor 33 for detecting the rotational angle of the motor 15 according to an abnormality detection state.

According to an abnormality detection state, the first reliability computation portion 53 computes the first reliability value C1 of the current sensor 31 that detects energization current to the motor 15.

According to an abnormality detection state, the second reliability computation portion 63 computes the second reliability value C2 of the torque sensor 32 that detects steering torque.

According to an abnormality detection state, the third reliability computation portion 73 computes the third reliability value C3 of the rotational angle sensor 33 that detects the mechanical angle θm which is the rotational angle of the motor 15.

The steering-shaft load estimation portion 81 estimates the steering shaft load Tx using (i) the assist torque detection value Tm that is a value corresponding to a detection value from the current sensor 31, (ii) the steering torque detection value Is that is a value corresponding to a detection value from the torque sensor 32, and (iii) the column-shaft angular speed detection value ωc that is a value corresponding to a detection value from the rotational angle sensor 33.

According to the reliability value C1, C2, or C3, the weighting computation portion 55, 65, or 75 changes the weighting of the assist torque detection value Tm, the steering torque detection value Ts, or the column-shaft angular speed detection value ωc that corresponds to a sensor, the abnormality of which is detected and is used for estimating the steering shaft load Tx. In the present embodiment, according to the corresponding reliability values C1, C2, C3, the weighting computation portions 55, 65, 75 decrease the weighting of the values for the estimation of the steering shaft load Tx to a value that is lower than in a normal state.

According to the first reliability value C1, the first weighting computation portion 55 changes the weighting of the assist torque detection value Tm that is used for estimating the steering shaft load Tx.

According to the second reliability value C2, the second weighting computation portion 65 changes the weighting of the steering torque detection value Ts that is used for estimating the steering shaft load Tx.

According to the third reliability value C3, the third weighting computation portion 75 changes the weighting of the column-shaft angular speed detection value ωc that is used for estimating the steering shaft load Tx.

During a period of time from when the abnormality of a sensor is detected until the sensor is confirmed as malfunctioning or returning to a normal state, the sensor may detect an inappropriate value. When a detection value is rapidly changed due to the abnormality of the sensor, the steering shaft load Tx computed using the detection value may be rapidly changed.

In the present embodiment, the respective reliability values C1, C2, C3 of the sensors 31 to 33 are computed according to abnormality detection states. The weighting of the values used for computing the steering shaft load Tx is changed according to the reliability values C1, C2, C3. Therefore, it may be possible to appropriately estimate the steering shaft load Tx. An appropriate computation of the assist torque command value Tm* is performed when the assist torque command value Tm* is computed based on the steering shaft load Tx. Accordingly, a rapid change in sensor value caused by sensor abnormality may be unlikely to affect the computed assist torque command value Tm*, and it may be possible to reduce the impact of the sensor abnormality on vehicle behavior.

During a period of time from when the abnormality of the current sensor 31, the torque sensor 32, or the rotational angle sensor 33 is detected until the abnormality is confirmed as a malfunction, according to the reliability value C1, C2, or C3, the weighting computation portion 55, 65, or 75 gradually decreases the assist torque detection value Tm, the steering torque detection value Ts, or the column-shaft angular speed detection value we that corresponds to a sensor, the abnormality of which is detected, and is used for estimating the steering shaft load Tx.

Thus, during a period of time from when the abnormality of the current sensor 31 is detected until the current sensor 31 is confirmed as malfunctioning, according to the first reliability value C1, the first weighting computation portion 55 gradually decreases the assist torque detection value Tm used for estimating the steering shaft load Tx.

During a period of time from when the abnormality of the torque sensor 32 is detected until the torque sensor 32 is confirmed as malfunctioning, according to the second reliability value C2, the second weighting computation portion 65 gradually decreases the steering torque detection value used for estimating the steering shaft load Tx.

During a period of time from when the abnormality of the rotational angle sensor 33 is detected until the rotational angle sensor 33 is confirmed as malfunctioning, according to the third reliability value C3, the third weighting computation portion 75 gradually decreases the column-shaft angular speed detection value ωc used for estimating the steering shaft load Tx.

Incidentally, the phrase "gradually decreasing of each of the aforementioned values" is not limited to a gradual decrease in each of these values, and includes a case in which these values are respectively decreased in phases according to the reliability values C1, C2, and C3.

Accordingly, it may be possible to restrict a rapid change in the estimated steering shaft load Tx. Since a rapid change in the assist torque command value Tm* computed based on the steering shaft load Tx is restricted, it may be possible to restrict a rapid change in the assist torque detection value Tm.

When a predetermined amount of time has elapsed without a malfunction being confirmed after the abnormality of the current sensor 31, the torque sensor 32, or the rotational angle sensor 33 is detected, and when the current sensor 31, the torque sensor 32, or the rotational angle sensor 33 returns to a normal state, the weighting computation portion 55, 65, or 75 gradually increases the assist torque detection value Tm, the steering torque detection value Ts, or the column-shaft angular speed detection value ωc, which corresponds to a sensor that has abnormality detected but is not confirmed as malfunctioning and which is used for estimating the steering shaft load Tx, within a range up to a normal value.

Thus, when a predetermined amount of time has elapsed without the malfunction of the current sensor 31 being confirmed after the abnormality of the current sensor 31 is detected, and the current sensor 31 returns to a normal state, the first weighting computation portion 55 gradually increases the assist torque detection value Tm used for estimating the steering shaft load Tx.

When a predetermined amount of time has elapsed without the malfunction of the torque sensor 32 being confirmed after the abnormality of the torque sensor 32 is detected, and the torque sensor 32 returns to a normal state, the second weighting computation portion 65 gradually increases the steering torque detection value Ts used for estimating the steering shaft load Tx.

When a predetermined amount of time has elapsed without the malfunction of the rotational angle sensor 33 being confirmed after the abnormality of the rotational angle sensor 33 is detected, and the rotational angle sensor 33 returns to a normal state, the third weighting computation portion 75 gradually increases the column-shaft angular speed detection value ωc used for estimating the steering shaft load Tx.

Incidentally, the phrase "gradually increasing of each of the aforementioned values" is not limited to a gradual increase in each of these values, and includes a case in which these values are respectively increased in phases according to the reliability values C1, C2, and C3.

Accordingly, it may be possible to restrict a rapid change in the estimated steering shaft load Tx. Since a rapid change in the assist torque command value Tm* computed based on the steering shaft load Tx is restricted, it may be possible to restrict a rapid change in the assist torque detection value Tm.

The control apparatus 41 includes the basic torque computation portion 82, the correction torque computation portion 85, and the adder 86. The basic torque computation portion 82 and the adder 86 compute the assist torque command value Tm* for the driving of the motor 15 based on the steering shaft load Tx. Accordingly, it may be possible to appropriately compute the assist torque command value Tm*.

In the present embodiment, the first reliability computation portion 53, the second reliability computation portion 63, and the third reliability computation portion 73 correspond to a reliability computation portion. The steering-shaft load estimation portion 81 corresponds to a steering-shaft load estimation portion. The basic torque computation portion 82, the correction torque computation portion 85, and the adder 86 correspond to an assist torque command value computation portion. The first weighting computation portion 55, the second weighting computation portion 65, and the third weighting computation portion 75 correspond to a weight changing portion.

The assist torque detection value Tm, the steering torque detection value Ts, and the column-shaft angular speed detection value ωc correspond to a current corresponding value, a torque corresponding value, and a rotational angle corresponding value, respectively. The count values of the malfunction counter and the return counter, and the state of the malfunction flag correspond to an abnormality detection state.

Second Embodiment

A control apparatus in a second embodiment of the present disclosure will be described with reference to FIG. 4.

Figure 4:
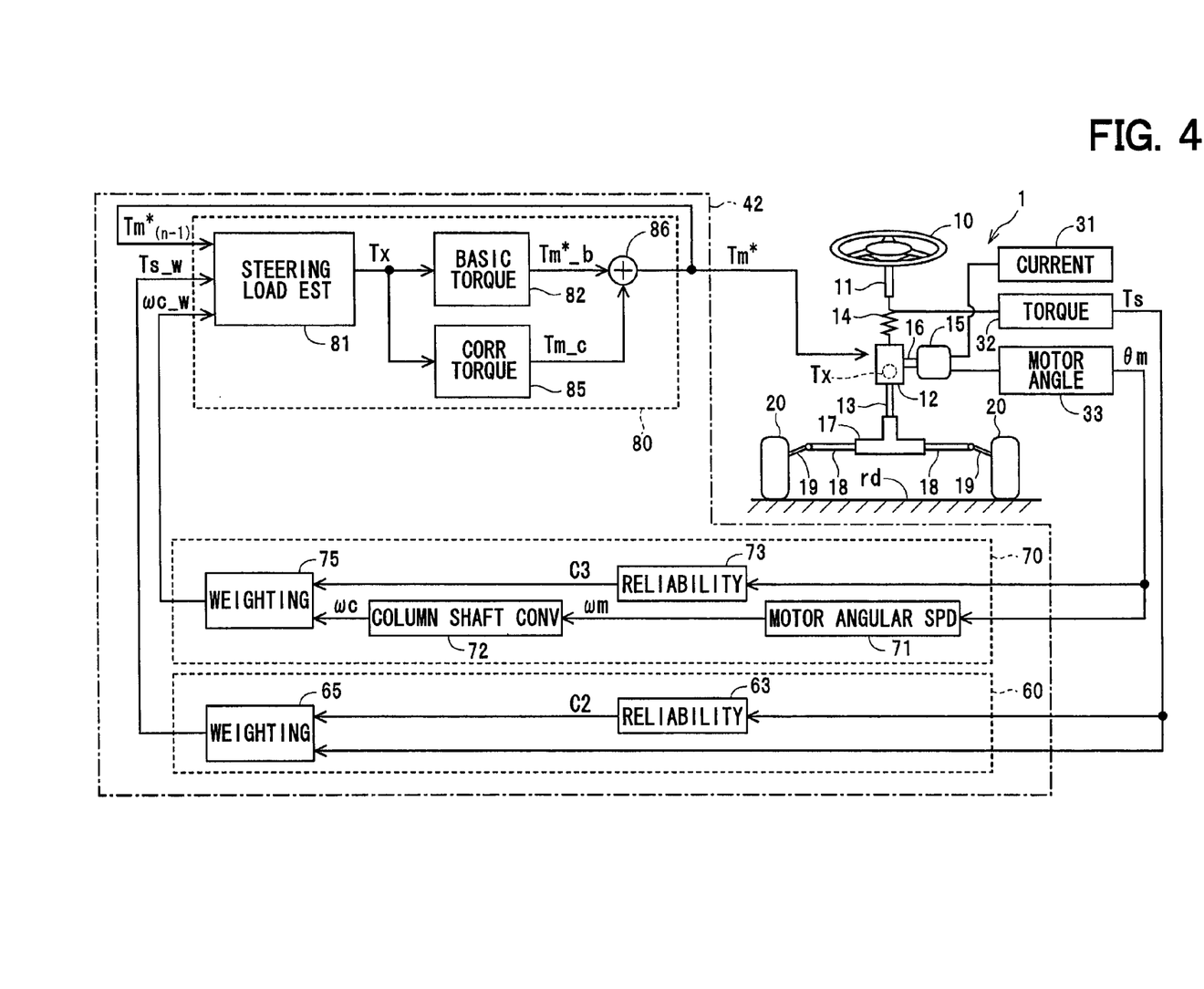
FIG. 4 is a diagram illustrating a schematic configuration of a control apparatus in a second embodiment.

As illustrated in FIG. 4, the first input value computation portion 50 is omitted from the configuration of a control apparatus 42 in the present embodiment. The steering-shaft load estimation portion 81 receives a last value $Tm^*_{(n-1)}$ of the assist torque command value as the first input value. The steering shaft load Tx is computed using the last value $Tm^*_{(n-1)}$ of the assist torque command value instead of the assist torque weighting value Tm_w.

In the present embodiment, since a feedback control is performed, the assist torque command value Tm* becomes a value corresponding to the phase currents Iu, Iv, Iw. In the present embodiment, the last value $Tm^*_{(n-1)}$ of the assist torque command value is deemed as the "current corresponding value", and is used for estimating the steering shaft load Tx.

In the present embodiment, the steering-shaft load estimation portion 81 estimates the steering shaft load Tx based on the last value $Tm^*_{(n-1)}$ of the assist torque command value for the driving of the motor 15. The current corresponding value is the last value $Tm^*_{(n-1)}$ of the assist torque command value. Incidentally, the "last value" is not limited to the most recent computation value, and may be a value computed before multiple cycles. Similarly, this applies to a last value $Tm^*\_b_{(n-1)}$ of a basic assist torque command value before correction, and a last value $Ts^*_{(n-1)}$ of the steering torque command value. Incidentally, the basic assist torque command value before correction may be referred to as a non-corrected basic assist torque command value.

It may be possible to reduce the noise effect of the current sensor 31 by using the assist torque command value Tm* instead of the assist torque detection value Tm that is computed based on a detection value from the current sensor 31, and is output from the motor 15.

The same effects as in the aforementioned embodiment are also obtained.

The last value $Tm^*\_b_{(n-1)}$ of the basic assist torque command value before correction may be used instead of the last value $Tm^*_{(n-1)}$ of the assist torque command value. The last value $Tm^*\_b_{(n-1)}$ of the basic assist torque command value before correction is included in a concept of the last value of an assist torque command value.

The current sensor 31 may be omitted.

Third Embodiment

Figure 5:
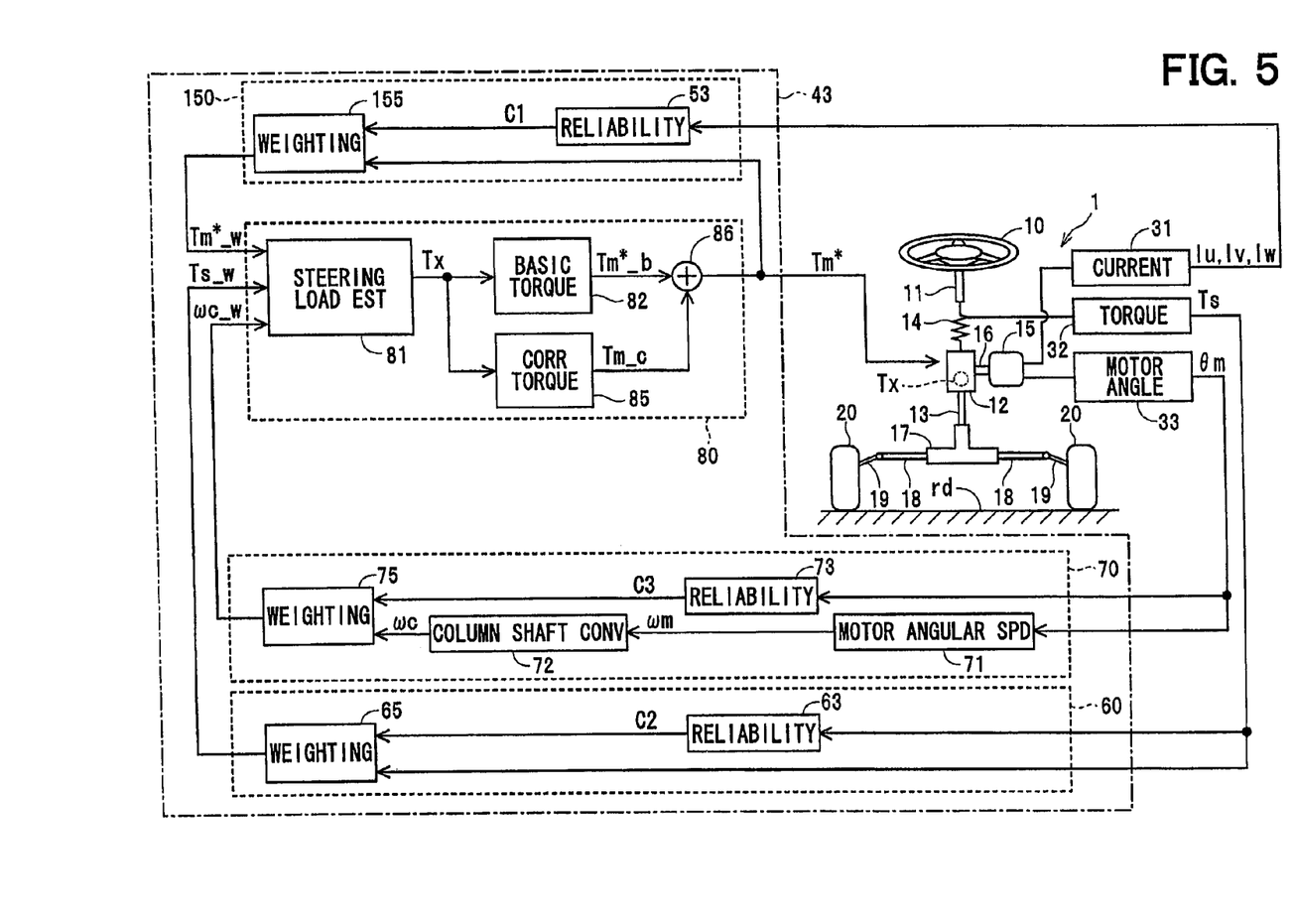
FIG. 5 is a diagram illustrating a schematic configuration of a control apparatus in a third embodiment.

FIG. 5 illustrates a control apparatus in a third embodiment of the present disclosure.

As illustrated in FIG. 5, a control apparatus 43 in the present embodiment includes a first input value computation portion 150 in addition to the configuration of the control apparatus 42 in the second embodiment. The first input value computation portion 150 includes the first reliability computation portion 53 and a first weighting computation portion 155.

The first weighting computation portion 155 computes a weighted assist torque command value Tm*_w that is the first input value, based on the last value Tm*$_{(n-1)}$ of the assist torque command value and the first reliability value C1. The weighted assist torque command value Tm*_w is computed using an expression (10). Similar to the first embodiment, Wm in the expression (10) represents a weighting coefficient corresponding to the first reliability value C1.

$$Tm^*\_w = Tm^*_{(n-1)} \times Wm \qquad (10)$$

The steering-shaft load estimation portion 81 estimates the steering shaft load Tx using the weighted assist torque command value Tm*_w instead of the assist torque weighting value Tm_w.

In the present embodiment, a feedback control is performed based on the phase currents Iu, Iv, Iw detected by the current sensor 31. When the current sensor 31 is in a normal state, the phase currents Iu, Iv, Iw have values that follow the assist torque command value Tm*. In the present embodiment, when the last value Tm*$_{(n-1)}$ of the assist torque command value is used for estimating the steering shaft load Tx, the weighting coefficient Wm for the last value Tm*$_{(n-1)}$ of the assist torque command value used for estimating the steering shaft load Tx is changed according to the reliability value C1 of the current sensor 31.

According to this configuration, the same effects as in the aforementioned embodiment are obtained.

In the present embodiment, instead of the first weighting computation portion 55, the first weighting computation portion 155 corresponds to the weight changing portion. Others are the same as in the first embodiment.

Fourth Embodiment

Figure 6:
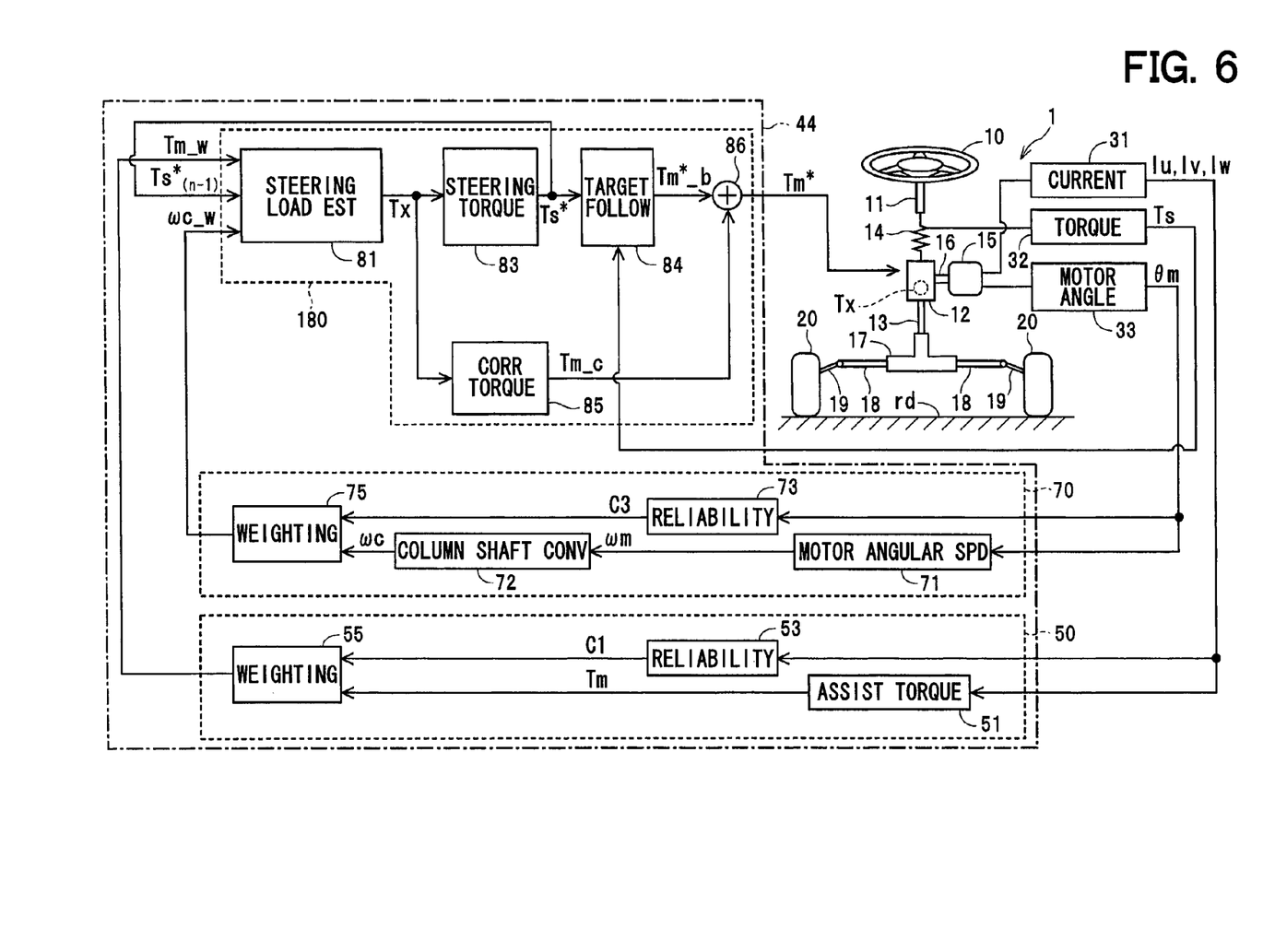
FIG. 6 is a diagram illustrating a schematic configuration of a control apparatus in a fourth embodiment.

FIG. 6 illustrates a control apparatus in a fourth embodiment of the present disclosure.

As illustrated in FIG. 6, the second input value computation portion 60 is omitted from the configuration of a control apparatus 44 in the present embodiment. A command value computation portion 180 includes a steering torque computation portion 83 and a target following controller 84 instead of the basic torque computation portion 82.

The steering torque computation portion 83 computes the steering torque command value Ts* based on the steering shaft load Tx.

The target following controller 84 computes the basic assist torque command value Tm*_b by performing a feedback computation based on the steering torque detection value Ts detected by the torque sensor 32 and the steering torque command value Ts* in order for the actual steering torque detection value Is to follow the steering torque command value Ts*.

The steering-shaft load estimation portion 81 receives a last value Ts*$_{(n-1)}$ of the steering torque command value, and computes the steering shaft load Tx using the last value Ts*$_{(n-1)}$ of the steering torque command value instead of the steering torque weighting value Ts_w. In the present embodiment, a feedback control is performed, and steering torque command value Ts* becomes a value corresponding to the steering torque detection value Ts. In the present embodiment, the last value Ts*$_{(n-1)}$ of the steering torque command value is deemed as the torque corresponding value, and is used for estimating the steering shaft load Tx.

The control apparatus 44 includes the steering torque computation portion 83, the target following controller 84, the correction torque computation portion 85, and the adder 86.

The steering torque computation portion 83 computes the steering torque command value Ts* based on the steering shaft load Tx.

The target following controller 84, the correction torque computation portion 85, and the adder 86 compute the assist torque command value Tm* for the driving of the motor 15 based on the steering torque command value Ts* and the steering torque detection value Ts.

In the present embodiment, the steering torque command value Ts* is computed based on the steering shaft load Tx. Thus, a common control related to the computation of the assist torque command value Tm* may be implemented regardless of the configuration of the column section C and the load section L. Accordingly, it may be possible to reduce the workload for adaptation for each vehicle type.

The steering shaft load Tx is estimated based on the last value Ts*$_{(n-1)}$ of the steering torque command value. The torque corresponding value is the last value Ts*$_{(n-1)}$ of the steering torque command value.

The same effects as in the aforementioned embodiment are obtained.

In the present embodiment, the steering torque computation portion 83 corresponds to a steering torque command value computation portion, and the target following controller 84, the correction torque computation portion 85, and the adder 86 correspond to the assist torque command value computation portion.

Fifth Embodiment

Figure 7:
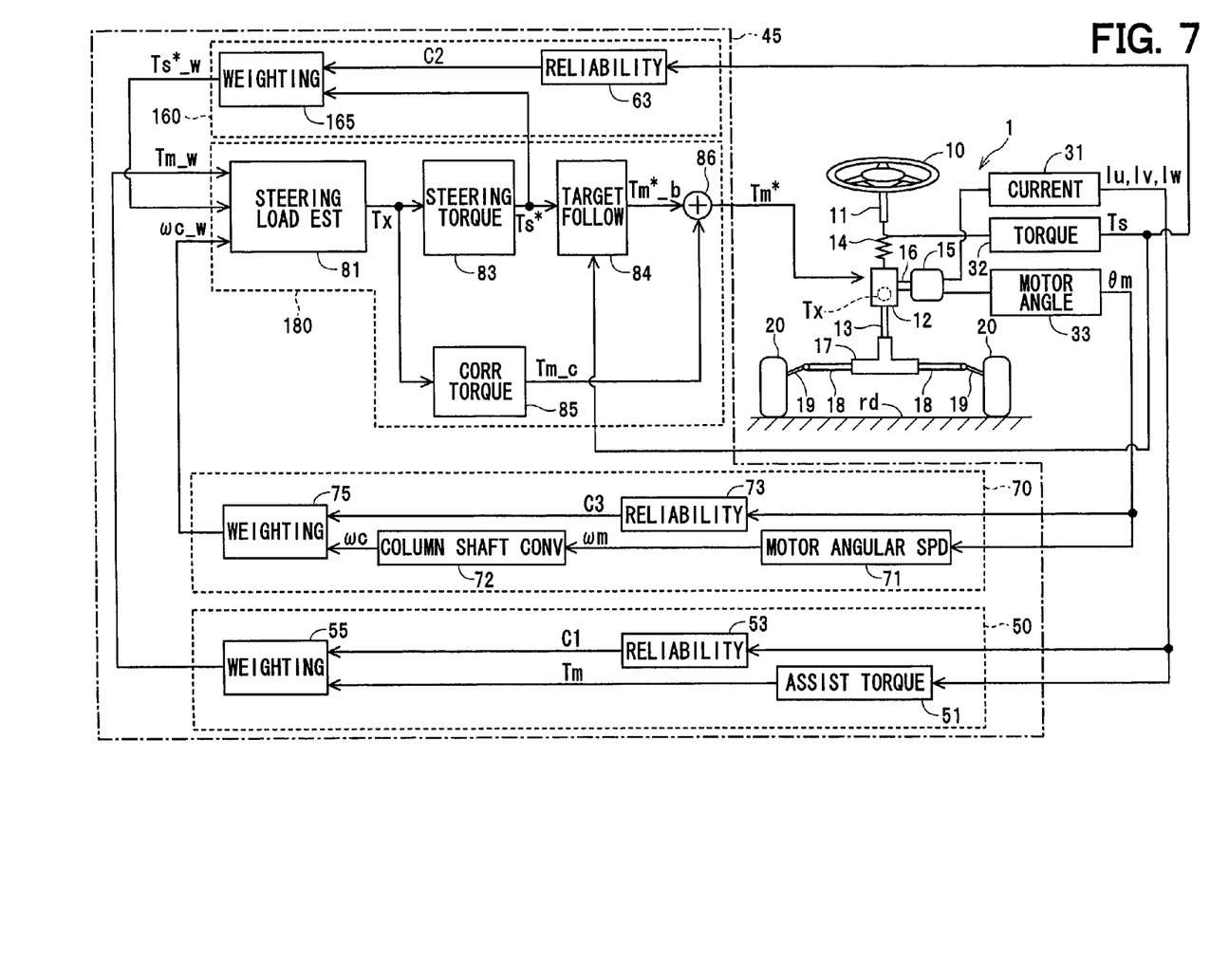
FIG. 7 is a diagram illustrating a schematic configuration of a control apparatus in a fifth embodiment.

FIG. 7 illustrates a control apparatus in a fifth embodiment of the present disclosure.

As illustrated in FIG. 7, a control apparatus 45 in the present embodiment includes a second input value computation portion 160 in addition to the configuration of the control apparatus 44 in the fourth embodiment. The second input value computation portion 160 includes the second reliability computation portion 63 and a second weighting computation portion 165.

The second weighting computation portion 165 computes a weighted steering torque command value Ts*_w as the second input value based on the last value Ts*$_{(n-1)}$ of the steering torque command value and the second reliability value C2. The weighted steering torque command value Ts*_w is computed using an expression (11). The weighted steering torque command value Ts*_w may be referred to as a weighted steering torque command value after weighting. Similar to the first embodiment, Ws in the expression (11) represents a weighting coefficient corresponding to the second reliability value C2.

$$Ts^*\_w = Ts^*_{(n-1)} \times Ws \qquad (11)$$

The steering-shaft load estimation portion 81 estimates the steering shaft load Tx using the weighted steering torque command value Ts*_w instead of the steering torque weighting value Ts_w.

In the present embodiment, a feedback control is performed based on the steering torque detection value Ts obtained by the torque sensor 32. When the torque sensor 32 is in a normal state, the steering torque detection value Ts has a value which follows the steering torque command value Ts*. In the present embodiment, when the last value Ts*$_{(n-1)}$ of the steering torque command value is used for estimating the steering shaft load Tx, the weighting coefficient Ws for the last value Ts*$_{(n-1)}$ of the steering torque command value used for estimating the steering shaft load Tx is changed according to the reliability value C2 of the torque sensor 32.

The same effects as in the aforementioned embodiment are obtained.

In the present embodiment, instead of the second weighting computation portion 65, the second weighting computation portion 165 corresponds to the weight changing portion. Others are the same as in the first embodiment.

Other Embodiments (1) Reliability Computation Portion and Weight Changing Portion In the first embodiment, the reliability of each of the current sensor, the torque sensor, and the rotational angle sensor is computed, and the weighting of a value used for estimating the steering shaft load is changed according to the reliabilities. In another embodiment, the reliability of at least one of the current sensor, the torque sensor, and the rotational angle sensor may be computed, and a part of the computation of reliability and the computation of weighting coefficient according to the reliability may be omitted.

This applies to the second to fifth embodiments.

In the above embodiment, the count value of the malfunction counter, the count value of the return counter, and the state of the malfunction flag correspond to an abnormality detection state. In another embodiment, a part of the count value of the malfunction counter, the count value of the return counter, and the state of the malfunction flag may be omitted. Parameters other than the count value of the malfunction counter, the count value of the return counter, or the malfunction flag may correspond to the abnormality detection state.

In another embodiment, when a sensor returns to the normal state without the malfunction of the sensor being confirmed after the abnormality of the sensor is detected, the weighting of a value used for estimating the steering shaft load is not necessarily changed according to the reliability. For example, the weighting coefficient may be set close to a normal value so as to restrict a rapid change.

(2) Steering-Shaft Load Estimation Portion

In the first embodiment, the steering-shaft load estimation portion estimates the steering shaft load using the assist torque as the current corresponding value, the steering torque as the torque corresponding value, and the column shaft angular speed as the rotational angle detection value.

In the second and third embodiments, the steering-shaft load estimation portion estimates the steering shaft load using the last value of the assist torque command value as the current corresponding value, the steering torque as the torque corresponding value, and the column shaft angular speed as the rotational angle detection value.

In the fourth and fifth embodiments, the steering-shaft load estimation portion estimates the steering shaft load using the assist torque as the current corresponding value, the last value of the steering torque command value as the torque corresponding value, and the column shaft angular speed as the rotational angle detection value.

In another embodiment, the steering-shaft load estimation portion may estimate the steering shaft load using the last value of the assist torque command value as the current corresponding value, the last value of the steering torque command value as the torque corresponding value, and the column shaft angular speed as the rotational angle detection value.

In the embodiment, the current corresponding value represents the assist torque or the assist torque command value. In another embodiment, as long as the current corresponding value represents a value corresponding to a detection value of the current sensor, the current corresponding value may be a value other than the assist torque or the assist torque command value.

In the embodiment, the torque corresponding value represents the steering torque or the steering torque command value. In another embodiment, as long as the torque corresponding value represents a value corresponding to a detection value from the torque sensor, the torque corresponding value may be a value other than the steering torque or the steering torque command value.

In the embodiment, the rotational angle corresponding value represents the column shaft angular speed. In another embodiment, as long as the rotational angle corresponding value represents a value corresponding to a detection value from the rotational angle sensor, the rotational angle corresponding value may be a value other than the column shaft angular speed such as a column shaft angular acceleration.

(3) Assist Torque Command Value Computation Portion

In the first to third embodiments, the assist torque command value is computed based on the steering shaft load. In another embodiment, in the configurations of the first to third embodiments, as illustrated in the fourth embodiment, the steering torque command value may be computed based on the steering shaft load, and the assist torque command value may be computed based on the steering torque command value.

In the fourth and fifth embodiments, the steering torque command value is computed based on the steering shaft load, and the assist torque command value is computed based on the steering torque command value. In another embodiment, in the configurations of the fourth and fifth embodiments, as illustrated in the first embodiment, the assist torque command value may be computed based on the steering shaft load, and the steering torque command value used for estimating the steering shaft load may be computed independently of the computation of the assist torque command value.

In the embodiment, the assist torque command value is computed by adding the basic assist torque command value and the correction torque using the adder. In another embodiment, the correction torque computation portion and the adder may be omitted, and the basic assist torque command value may be used as the assist torque command value. The basic torque computation portion 82 or the target following controller 84 may work as the assist torque command value computation portion.

(4) Electric Power Steering System

The electric power steering system in the embodiment is a so-called column assist electric power steering system that applies the assist torque of the motor to the column shaft. In another embodiment, an electric power steering system may be configured to apply the assist torque to portions other than the column shaft, and for example, may be a "rack assist"

electric power steering system that applies the assist torque of the motor to the rack shaft.

The present disclosure is not limited to the embodiments, and the present disclosure may be realized in various forms insofar as the various forms do not depart from the purport of the present disclosure.

While the embodiments, the configurations, and the modes of the control apparatus according to the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control apparatus controlling a motor of an electric power steering system including: an input shaft that is connected to a steering member configured to be turned by a driver; a column shaft that is connected to the input shaft at a position opposite to the steering member; a turning device that includes a rack and pinion mechanism converting a rotational motion of the column shaft into a reciprocating motion, and turns a wheel; and the motor that generates assist torque assisting turning of the steering member, the control apparatus comprising:
   a reliability computation portion that computes a reliability according to an abnormality detection state for at least one of
      a current sensor detecting an energization current to the motor,
      a torque sensor detecting a steering torque, and
      a rotational angle sensor detecting a rotational angle of the motor;
   a steering-shaft load estimation portion that estimates a steering shaft load using
      a current corresponding value corresponding to a detection value from the current sensor,
      a torque corresponding value corresponding to a detection value from the torque sensor, and
      a rotational angle corresponding value corresponding to a detection value from the rotational angle sensor; and
   a weight changing portion that changes a weighting of a corresponding value from among the current corresponding value, the torque corresponding value and the rotational angle corresponding value, according to the reliability computed by the reliability computation portion,
   wherein the corresponding value corresponds to one sensor having a detected abnormality from among the current sensor, the torque sensor and the rotational angle sensor.

2. The control apparatus according to claim 1, wherein:
   during a period of time from when the abnormality of at least one of the current sensor, the torque sensor, and the rotational angle sensor is detected to when the abnormality is confirmed as a malfunction,
   according to the reliability, the weight changing portion gradually decreases the corresponding value that corresponds to the one sensor having the detected abnormality.

3. The control apparatus according to claim 1, wherein:
   when the abnormality of at least one of the current sensor, the torque sensor, and the rotational angle sensor is detected, when a predetermined amount of time elapses without a malfunction being confirmed, and when the at least one of the current sensor, the torque sensor, and the rotational angle sensor returns to a normal state,
   the weight changing portion gradually increases the corresponding value used in estimation of the steering shaft load within a range up to a normal value,
   wherein the corresponding value is any of the current corresponding value, the torque corresponding value and the rotational angle corresponding value and corresponds to the one sensor having the detected abnormality without the malfunction being confirmed.

4. The control apparatus according to claim 1, wherein:
   the current corresponding value represents an assist torque detection value computed based on a detection value from the current sensor.

5. The control apparatus according to claim 1, wherein:
   the current corresponding value represents a last value of an assist torque command value.

6. The control apparatus according to claim 1, wherein:
   the torque corresponding value represents a steering torque detection value obtained by the torque sensor.

7. The control apparatus according to claim 1, wherein:
   the torque corresponding value represents a last value of a steering torque command value.

8. The control apparatus according to claim 1, wherein:
   the motor is connected to the column shaft; and
   the rotational angle corresponding value represents a detection value of a rotational angular speed of the column shaft, the detection value being computed based on another detection value from the rotational angle sensor.

9. The control apparatus according to claim 1, further comprising:
   an assist torque command value computation portion that computes an assist torque command value for driving of the motor based on the steering shaft load.

10. The control apparatus according to claim 1, further comprising:
    a steering torque command value computation portion that computes a steering torque command value based on the steering shaft load; and
    an assist torque command value computation portion that computes an assist torque command value for driving of the motor based on the steering torque command value and the steering torque.

11. The control apparatus according to claim 9, wherein:
    the reliability computation portion determines whether at least one of the current sensor, the torque sensor, and the rotational angle sensor is in the abnormality detection state;
    the reliability computation portion receives a detection value from the current sensor, the torque sensor, and the rotational angle sensor;
    the estimated steering shaft load, which is estimated by the steer-shaft load estimation portion, is outputted to the assist torque command value computation portion; and
    the motor is controlled based on the assist torque command value.

* * * * *